(No Model.)

J. B. ENTZ & W. A. PHILLIPS.
SECONDARY BATTERY.

No. 467,573. Patented Jan. 26, 1892.

WITNESSES:
Frank S. Ober
Wm A Rosenbaum

INVENTORS:
Justus B. Entz
William A. Phillips
BY
ATTORNEY.

UNITED STATES PATENT OFFICE.

JUSTUS B. ENTZ, OF NEW YORK, AND WILLIAM A. PHILLIPS, OF BROOKLYN, NEW YORK.

SECONDARY BATTERY.

SPECIFICATION forming part of Letters Patent No. 467,573, dated January 26, 1892.

Application filed January 7, 1891. Serial No. 376,977. (No model.)

*To all whom it may concern:*

Be it known that we, JUSTUS B. ENTZ, a citizen of the United States, residing in New York, in the county and State of New York, and WILLIAM A. PHILLIPS, a subject of the Queen of Great Britain, residing in Brooklyn, county of Kings, and State of New York, have invented certain new and useful Improvements in Secondary Batteries, of which the following is a specification.

Our invention relates to secondary batteries and has special reference to the method of treating the battery while undergoing the processes of charging and discharging.

The object of the invention is to render the electrolytic action uniform, thereby producing such advantages as increased capacity, longer life, more rapid charge, and general improvement in the action of the battery.

The invention consists simply in applying heat to the cells, preferably at the bottom, while they are being charged or discharged, thus setting up a circulation of the electrolyte.

The apparatus for carrying out the above process or method is shown in the accompanying drawings, in which—

Figure 1:
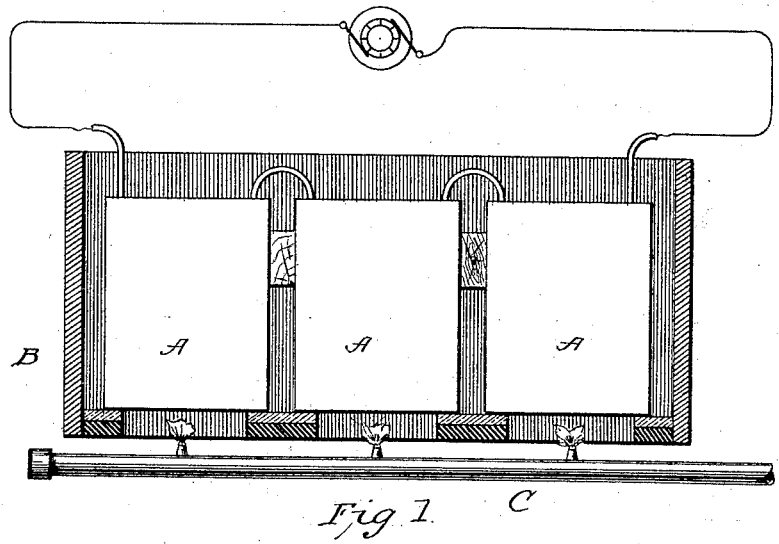
Figure 2:
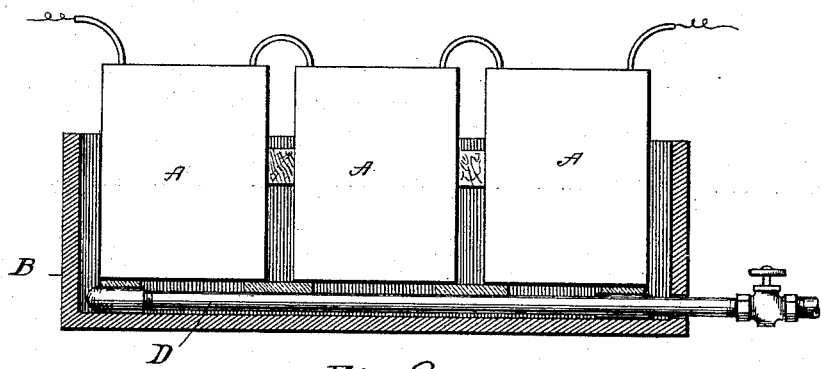

Figure 1 represents a sectional elevation of one form of apparatus, and Fig. 2 a similar view of another form.

In this apparatus, A represents secondary-battery cells, containing the usual positive and negative plates or electrodes and a metallic solution or electrolyte; B, a tray having an open-work bottom, upon which the battery-cells rest, and C a gas-pipe extending along under the cells and tray and provided with jets or burners located under the center of each cell.

In Fig. 2, D represents steam-coils, which may be located in the bottom of the tray containing the cells, or otherwise placed so that the heat which they afford may be imparted to the lower portion of the cells.

In operation the complete working-cells containing a metallic solution while the charging-current is being applied to them are subjected to the heat of the gas-flames or steam-coils. We find that when the cells are treated in this manner the action of the battery is greatly improved. Its internal resistance is lowered, it has a longer life, and the battery will take a more rapid charge. When cells are charged without the application of heat the electrolytic action is more prominent on the lower half of the electrodes, which would indicate that the metallic solution used was more dense in the lower portions of the cell than nearer the surface, and we believe that the application of heat to the lower parts of the cells overcomes this defective action by establishing a circulation in the solution, thereby maintaining its density or the distribution of the metallic particles uniform and insuring a uniform action on the plates. The circulation may be maintained by mechanical agitators with good results; but we prefer to use heat, because it lowers the resistance of the battery and causes the plating action to take place more easily.

It will be observed that our invention is confined to batteries containing a metallic solution and that the method is practiced after the cells are entirely completed and in working form.

It has been proposed to heat the plates of a secondary battery as a part of the process of manufacture or "forming" of the electrodes and to perform that operation in the absence of current, or in the absence of any effective current, and we therefore disclaim such, our process having to do with the perfected battery-cell. Our method of course is not confined to any particular degree of heat so long as the lower portion of the liquid is warmer than the upper portion. Neither is the method confined to any particular apparatus for carrying it out. In central-station work it may be found desirable to heat the battery while being discharged also. We therefore claim this as a part of our invention.

Having thus described our invention, we claim—

1. The method herein described of treating secondary electric batteries containing a metallic solution, which consists in agitating or setting up a circulation in the solution or electrolyte while the battery is being charged or discharged.

2. The method herein described of treating secondary electric batteries containing a metallic solution, which consists in applying heat to the cells while they are being charged or discharged.

3. The method herein described of treating secondary electric batteries containing a metallic solution, which consists in applying heat to the lower end or bottom of a cell or cells while the same are being charged or discharged.

In witness whereof we have hereunto signed our names in the presence of two subscribing witnesses.

JUSTUS B. ENTZ.
WILLIAM A. PHILLIPS.

Witnesses:
LOUIS F. DOYLE,
HIRAM M. KIRK.